United States Patent

[11] 3,607,518

[72] Inventor Daniel H. Ellinor
 11418 Denton Drive, Dallas, Tex. 75229
[21] Appl. No. 884,676
[22] Filed Dec. 12, 1969
[45] Patented Sept. 21, 1971

[54] METHOD OF PRODUCING EXPANDED DOUBLE-FACED HONEYCOMB PANELS
 10 Claims, 6 Drawing Figs.
[52] U.S. Cl. .................................................. 156/197,
 156/313
[51] Int. Cl. ................................................... B31d 3/02
[50] Field of Search ...................................... 156/197,
 313

[56] References Cited
UNITED STATES PATENTS
2,952,579  9/1960  Merriman ..................... 156/197 X
3,106,503  10/1963  Randall et al. ................ 156/197
3,211,091  10/1965  Garrett ......................... 156/313 X Primary Examiner—Benjamin A. Borchelt
Assistant Examiner—G. E. Montone
Attorney—Berman, Davidson and Berman ABSTRACT: Compressed honeycomb stock is expanded to fit inside a frame and temporarily secured in the frame in expanded condition. The frame, with the expanded honeycomb therein, is then surfaced on both sides with layers of scrim or cheesecloth which have been saturated with a solution of thermoplastic or thermosetting material in a volatile solvent. The cheesecloth is firmly in contact with the frame and with the crests of the honeycomb structure and adheres thereto with the thermoplastic acting as an adhesive. The solvent is permitted to evaporate and the frame, with the cloth facings, is then faced on both sides with a layer of metallic foil, preferably aluminum. The composite structure is then placed in a heated press for a time and at a temperature and pressure sufficient to reactivate the thermoplastic residue in the cloth and bring about a firm bond between the frame, the honeycomb, the cloth and the aluminum foil whereby to produce a panel or sandwich of honeycomb stock surfaced on each side with metallic foil.

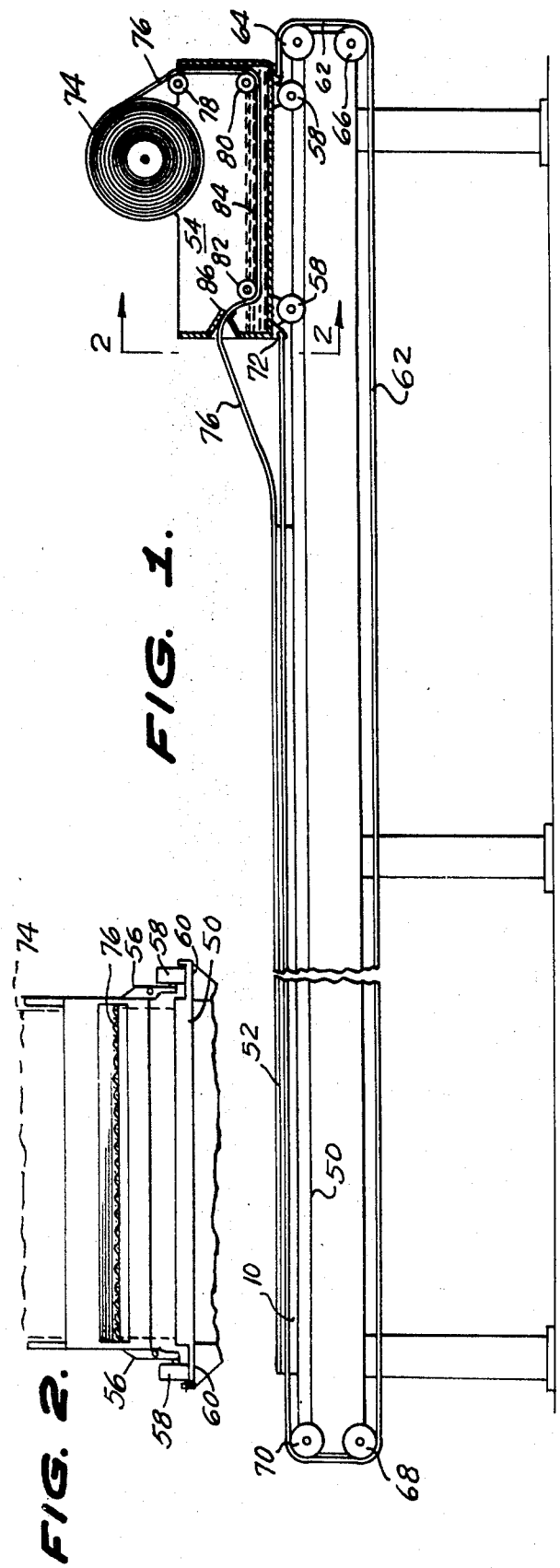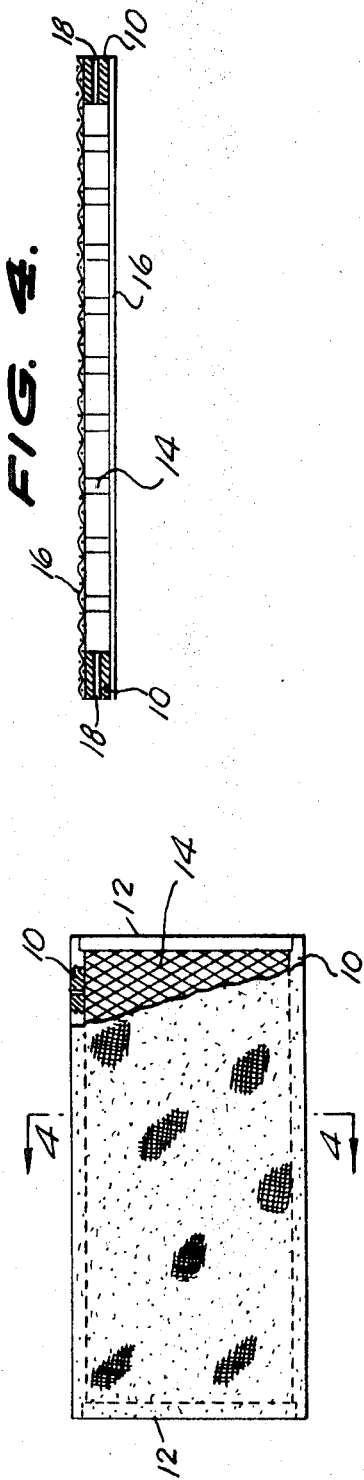

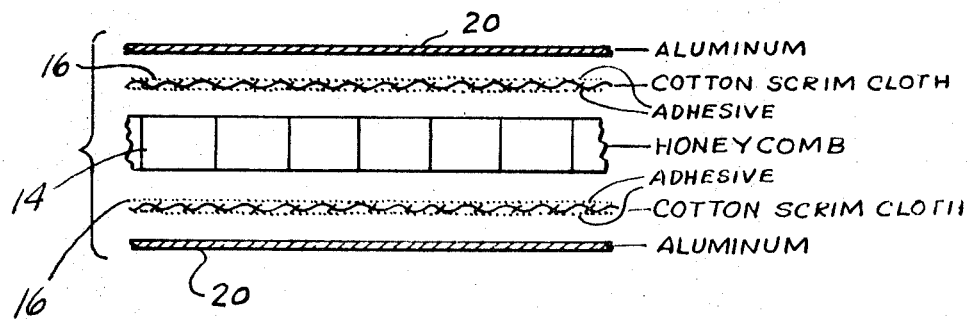
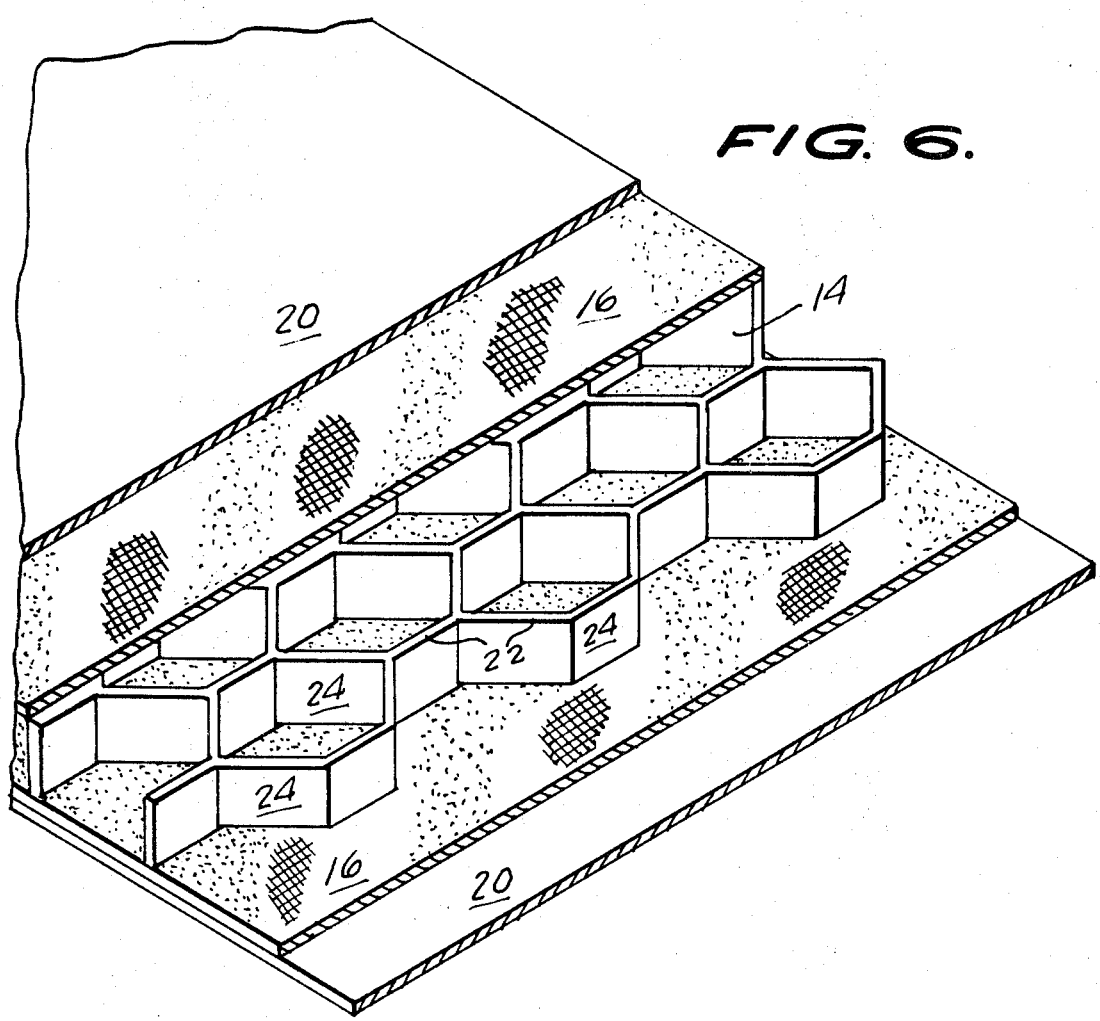

METHOD OF PRODUCING EXPANDED DOUBLE-FACED HONEYCOMB PANELS

BACKGROUND OF THE INVENTION

The so-called "sandwich" comprising a core of expanded kraft paper honeycomb stock surfaced on each side with aluminum foil has a wide variety of uses, both military and commercial. Heretofore, such sandwiches have been made by either of two processes. The first of these may be referred to as "a liquid adhesive system." In this system, with the honeycomb core expanded, the edges of the honeycomb receive an application of wet adhesive and the aluminum sheeting also receives an application of wet adhesive. The honeycomb in particular must receive a very wet application to force the adhesive into the paper fiber. Prior to applying adhesive to the aluminum skin, the aluminum must be chemically treated to produce a clean, oil-free surface. After application of the adhesive, the components may be air-dried or force-dried to remove solvents and since, with this system, it is essential that all of the solvents be removed, the drying is usually under controlled humidity and temperature conditions. The foil is then placed on the honeycomb and subjected to a hot pressing operation.

A second method may be called "the film adhesive system." It duplicates method 1 so far as cleaning the surfaces and application of wet adhesive are concerned and the surfaces are dried prior to mating. When assembling the components, a layer of film coated on both sides with adhesive is inserted between the surfaces and the structure then is given a hot press. This is more expensive than the liquid adhesive system but has the advantage of producing panels or sandwiches with a high consistency in strength.

It is an object of this invention to provide a method of forming sandwiches as aforesaid in which the aluminum cleaning step or steps are eliminated and in which there is superior penetration of bonding to the kraft paper honeycomb stock.

It is a further object of this invention to eliminate the necessity for controlled temperature and humidity during the drying step.

It is a further object of this invention to provide a method as aforesaid in which the bond formed in successive panels is consistent and uniform.

The above and other objects will be made clear from the following detailed description taken in connection with the annexed drawings, in which:

FIG. 1 is a side elevation partly in section showing an apparatus for carrying out the major step in the improved method;

FIG. 2 is a section on the line 2—2 of FIG. 1;

FIG. 3 is a plan view, with parts broken away, of a typical base panel produced by this method;

FIG. 4 is a section on the line 4—4 of FIG. 3;

FIG. 5 is an exploded cross section of the finished panel; and

FIG. 6 is a perspective view showing the various parts of the panel in assembled condition.

This invention perhaps will be most easily understood by immediate reference to FIGS. 3–6. FIG. 3 shows a wooden frame having side members 10 and end members 12. Within the frame, and temporarily secured thereto, is a section of expanded honeycomb 14. Stretched over the frame and secured thereto, as well as to the honeycomb 14, is a strip of adhesive impregnated fabric 16.

As best seen in FIG. 4, frame member 10 and 12 are pierced at intervals along their length by traverse venting channels 18 for a purpose presently to be described.

Reference should now be had to FIGS. 5 and 6. As best seen in FIG. 5, the ultimate sandwich is composed of the honeycomb core 14 which receives on each side an adhesive impregnated web 16 which in turn receives an outer ply 20 usually and preferably of aluminum foil which, in practice, has a caliper between 0.005 inch and 0.006 inch, though neither limit is critical. The cloth or scrim 16 may be of various weights and densities, though a mesh 26×28 has been found satisfactory in most cases. The cloth is thoroughly impregnated with a suitable plastic adhesive in a solvent vehicle. The adhesive solid plus solvent should be reasonably fluid and at least of a sprayable viscosity. The reason for this is that when the saturated cloth 16 meets the crests 22 of the honeycomb 14, the solvent plus the adhesive, being in liquid condition, tends to penetrate the fibers of the kraft paper honeycomb 14, thus effecting a mechanical bond between the cloth and the honeycomb which is complete in itself and does not depend on flow and/or curing of the adhesive solids under the ultimate heat and pressure sealing step.

The same thing is repeated on the opposite side of the core 14. The panel then is placed in a drying rack, preferably to stand in a vertical plane so that both sides dry at the same rate and the solvent simply is permitted to evaporate. Because the cloth plies 16 have a high degree of porosity, even after impregnation with the adhesive solution, the drying is comparatively rapid regardless of temperature and humidity. Under normal conditions, one hour will suffice but even under the most adverse conditions of low temperature and high humidity, not more than 6 hours is required for drying. The drying occurs from the inside out and the solvent evaporating from the interior passes through the impregnated gauze and tends to keep the exterior soft until the drying is complete. Preferably, the outer surface of the cloth should be slightly tacky or sticky when the outer aluminum plies 20 are applied and the panel placed between heated platens.

During the hot press step, particularly when performed under the conditions mentioned in the preceding paragraph, the step may drive out a small amount of residual solvent. The residual solvent, however, is sufficiently minimal so that it may penetrate the vertical walls 24 of the kraft paper honeycomb 14. These walls usually will be made of 70 or 80 pounds basis weight (3,000 square feet) and are inherently porous so far as the passage of gases or vapor is concerned, and the previously described vents 18 in frame members 10 and 12 permit egress to the atmosphere.

It is notable that, without exception, the manufacturers of adhesive of types suitable for the present application recommend extreme care in cleaning the bonding surfaces of aluminum and aluminum alloys before any attempt at bonding with the adhesive.

For whatever reason, with the method disclosed herein, aluminum or magnesium stock may be applied directly from its original roll without the necessity of any cleaning step. Elimination of the cleaning step not only saves a great deal of time but also a great deal of money since relatively expensive chemicals and solvents must be used quite liberally. Where the cleaning step is required, there is always the danger that an occasional sheet or portion of the sheet will be insufficiently cleaned and hence will produce a defective panel. In military procurement, specifications and standards are rigid in the extreme and the parts are subjected to testing and inspection of the most rigorous nature. Accordingly, the present process not only reduces the cost of production and speeds up the production process, but it also avoids what otherwise would be a perceptible (and expensive) percentage of rejects. Referring now to FIGS. 1 and 2, the apparatus disclosed therein is not at all sophisticated. It has been found, however, to do a very satisfactory job and is shown here to complete the disclosure. The apparatus comprises a table 50 on which are placed panels 52 comprising, for each panel, side and end members 10 and 12 within which is expanded honeycomb stock 14. A tank 54 has side brackets 56 (FIG. 2) in which are journaled carriage wheels 58. These rest on tracks 60 which extend the full length of the table 50.

At the right hand end of FIG. 1 a cable 62 is shown secured to the rear side of the tank 54 and, as passing first around a pulley 64, a second and lower pulley 66, thence at the opposite end around a lower pulley 68, then around an upper pulley 70, and back to join the front side of the tank 54 at the point marked 72.

A motor (not shown) may be placed in any suitable location and has pulleys around which are wrapped the belts or cords 62. The motor is reversible so that it may operate to draw the tank 54 either from left to right or right to left in FIG. 1. Journaled in the upper portion of the tank 54 is a roll of gauze or scrim 74, from which a web 76 is drawn. The web 76 passes over a guide roll 78, thence over a lower guide roll 80, whence it proceeds adjacent the bottom of the tank 54 to another, lower guide roll 82. The tank 54 contains a substantial depth of a solvent adhesive mixture 84 and the web 76 is completely submerged in the solution between the pulleys 80 and 82. From the pulley 82, the web 76 passes through an orifice 86 which is designed to doctor off the solution and to retain a predetermined amount. Obviously, on leaving the orifice 86, the web 76 is wet and thoroughly saturated with the adhesive solution.

In operation, the tank 54 is drawn to the left hand end of FIG. 5 and the free extremity of the web 76 is secured. The motor is then reversed to advance the tank 54 toward the right hand end of FIG. 1. This withdraws an additional length of web 76 from the roll 74 and permits it to lie flatly upon the panels 52. The web in this case extends not only over the honeycomb 14 but also over the side members 10 and end member 12 of the frame. When the tank 54 reaches the position shown in FIG. 1, the web 76 is severed leaving, of course, the free edge protruding outwardly from the tank 54. The cutoff portion is pressed firmly into engagement with the frames 52, the web is then severed between consecutive frames, if several are on the table, and these are ready either for a preliminary one-side drying step (preferred) or to be turned over and the operation repeated to face the opposite side of the frames.

When both sides have been covered, the frames are removed from the table 50 and placed in suitable drying racks where they stand vertically. The optimum extent of drying, or rather the optimum consistency or tackiness of the gauze surfaces must be determined empirically for each adhesive-solvent combination. When the desired consistency is reached, the panels are removed from the racks, placed in a horizontal position and a layer of foil is fitted and pressed against each side, the panels are then put into a conventional hot platen press and subjected to whatever combination of time, temperature and pressure is recommended by the manufacturer for the particular adhesive. Suitable adhesives are numerous and available from many, many manufacturers. Purely, by way of specific example, reference is made to adhesive EC-1415, produced by Minnesota Mining & Manufacturing Co., St. Paul, Minn. This is a thermosetting Paul particularly useful in bonding honeycomb stock formed of phenolic impregnated kraft paper. The various formulations vary widely.

The basis weight and mesh of the gauze again must be determined empirically, depending on the particular job to be done. This applies equally to the selection of the depth and mesh of honeycomb and to whatever treatment to which the paper stock may be subjected before it is formed into honeycomb.

It is clear that the basic components, namely, foil, scrim, adhesive and honeycomb stock may vary widely. It is equally clear that an almost endless variety of means may be used to carry out the process. It is not intended, therefore, that this invention be limited to the precise details disclosed herein which are illustrative and not definitive.

What is claimed is:

1. A method of making panels of double-faced, expanded honeycomb stock, said method comprising: expanding paper honeycomb stock to form a panel of predetermined dimensions; facing at least one side of said panel with cloth impregnated with a thermosetting adhesive dissolved in a volatile solvent, said cloth being applied while still wet; evaporating at least most of the solvent and producing a tacky surface on the side of the cloth opposite the honeycomb; applying to the tacky surface of the cloth a layer of metallic foil and thereafter subjecting said panel to heat and pressure for sufficient time to effect adhesion between said honeycomb, said cloth and said foil.

2. The method of claim 1, in which the metallic foil is applied in the condition of cleanliness in which it comes from the original roll.

3. The method of claim 1, including forming a wooden frame to define the edges of a panel of the desired dimensions and securing said expanded honeycomb within such frame before said application of said impregnated cloth.

4. The method of claim 3, in which the metallic foil is applied in the condition of cleanliness in which it comes from the original roll.

5. The method of claim 1, including: causing relative movement between said expanded honeycomb and a source of impregnated cloth whereby to cause said cloth to lie in contact with said honeycomb.

6. The method of claim 5, in which the metallic foil is applied in the condition of cleanliness in which it comes from the original roll.

7. The method of claim 5, including forming a wooden frame to define the edges of a panel of the desired dimensions and securing said expanded honeycomb within such frame before said application of said impregnated cloth.

8. The method of claim 2, including forming a wooden frame to define the edges of a panel of the desired dimensions and securing said expanded honeycomb within such frame before said application of said impregnated cloth.

9. The method of claim 1, including positioning frame means about the edges of the honeycomb panel and securing the expanded honeycomb to said frame means before application of the impregnated cloth.

10. The method of claim 2, including positioning frame means about the edges of the honeycomb panel and securing the expanded honeycomb to said frame means before application of the impregnated cloth.